United States Patent
Waschke

(10) Patent No.: US 8,101,082 B2
(45) Date of Patent: Jan. 24, 2012

(54) WASTE-ACTIVATED SLUDGE TREATMENT METHODS AND APPARATUS

(75) Inventor: Gerd Peter Waschke, West Vancouver (CA)

(73) Assignee: Pierway Envromental Inc., West Vancouver, CA (US)

( * ) Notice: Subject to any disclaimer, the term of this patent is extended or adjusted under 35 U.S.C. 154(b) by 412 days.

(21) Appl. No.: 12/300,553

(22) PCT Filed: May 11, 2007

(86) PCT No.: PCT/CA2007/000829
§ 371 (c)(1),
(2), (4) Date: Nov. 12, 2008

(87) PCT Pub. No.: WO2007/131341
PCT Pub. Date: Nov. 22, 2007

(65) Prior Publication Data
US 2009/0166288 A1    Jul. 2, 2009

Related U.S. Application Data

(60) Provisional application No. 60/747,178, filed on May 12, 2006, provisional application No. 60/803,380, filed on May 29, 2006.

(51) Int. Cl.
*C02F 3/00*        (2006.01)
*B01D 35/00*       (2006.01)

(52) U.S. Cl. ........ 210/623; 210/624; 210/625; 210/626; 210/627; 210/628; 210/173

(58) Field of Classification Search .......... 210/623–628, 210/173
See application file for complete search history.

(56) References Cited

U.S. PATENT DOCUMENTS

| | | | |
|---|---|---|---|
| 3,342,731 A * | 9/1967 | Baumann et al. | 210/711 |
| 3,428,554 A * | 2/1969 | Dye | 210/614 |
| 3,440,165 A | 4/1969 | Davis et al. | |
| 3,442,498 A | 5/1969 | Davis | |
| 3,549,529 A | 12/1970 | Wiseman | |
| 3,728,254 A | 4/1973 | Carothers | |
| 3,803,806 A | 4/1974 | Komline, Sr. | |
| 4,028,130 A * | 6/1977 | Webster et al. | 106/697 |
| 4,271,013 A * | 6/1981 | Bhattacharyya | 210/617 |
| 4,297,122 A * | 10/1981 | Wallace | 71/12 |
| 4,340,473 A * | 7/1982 | Lindman et al. | 210/173 |
| 4,541,933 A * | 9/1985 | Arnold et al. | 210/780 |
| 4,554,002 A * | 11/1985 | Nicholson | 71/12 |
| 4,735,729 A * | 4/1988 | Dietrich et al. | 210/712 |
| 4,778,598 A * | 10/1988 | Hoffman et al. | 210/710 |

(Continued)

FOREIGN PATENT DOCUMENTS
GB    2216114 A1    10/1989

*Primary Examiner* — Chester Barry
(74) *Attorney, Agent, or Firm* — Oyen Wiggs Green & Mutala LLP

(57) ABSTRACT

A method for treating waste-activated sludge comprises adding (1) a pozzolanic material to waste-activated sludge to form a mixture. The mixture is homogenized and aerated (2). The pozzolanic material reacts with the waste-activated sludge. The mixture is allowed to settle (3). A portion of the mixture is recirculated (4) from a downstream location to an upstream location. The recycled mixture includes pozzolanic material. Some embodiments provide advantages over existing wastewater treatment methods which may include: reduction or elimination of unpleasant odours, reduction of overall costs, conversion of waste into useful products, and/or reduction or elimination of discharged bacteria or other undesirable materials.

49 Claims, 8 Drawing Sheets

U.S. PATENT DOCUMENTS

| | | | |
|---|---|---|---|
| 4,917,802 A * | 4/1990 | Fukaya et al. | 210/605 |
| 5,078,882 A | 1/1992 | Northrop | |
| 5,104,552 A * | 4/1992 | Cicchiello et al. | 210/727 |
| 5,336,290 A | 8/1994 | Jermstad | |
| 5,482,528 A * | 1/1996 | Angell et al. | 71/12 |
| 5,853,590 A * | 12/1998 | Burnham | 210/609 |
| RE38,238 E * | 8/2003 | Nicholson et al. | 405/129.27 |
| 7,662,205 B2 * | 2/2010 | Burnham | 71/11 |
| 2006/0243009 A1 * | 11/2006 | Burnham | 71/11 |
| 2006/0254331 A1 * | 11/2006 | Burnham | 71/11 |
| 2010/0139346 A1 * | 6/2010 | Burnham | 71/12 |

\* cited by examiner

WASTE-ACTIVATED SLUDGE TREATMENT METHODS AND APPARATUS

CROSS-REFERENCE TO RELATED APPLICATIONS

This application claims priority from U.S. patent application Nos. 60/747,178 filed on 12 May 2006 and 60/803,380 filed on 29 May 2006, both entitled ACTIVATED SLUDGE TREATMENT METHODS AND APPARATUS. For purposes of the United States of America, this application claims the benefit under 35 U.S.C. §119 of U.S. patent application Nos. 60/747,178 filed on 12 May 2006 and 60/803,380 filed on 29 May 2006, both entitled ACTIVATED SLUDGE TREATMENT METHODS AND APPARATUS, both of which are hereby incorporated herein by reference.

TECHNICAL FIELD

This invention relates to treating wastewater (e.g. sewage). In particular, the invention relates to methods and apparatus for treating waste-activated sludge.

BACKGROUND

Conventional wastewater treatment systems have a number of disadvantages. Some wastewater treatment processes can require lengthy microbial digestion processes that may last weeks. Plants that implement such processes require high-capacity, high energy-consuming, expensive equipment. Wastewater treatment can also require the addition of various chemicals to assist in separating the solids found in waste-activated sludge. These chemicals can include dewatering agents, thickening agents, flocculants and the like. Chemical costs can be significant. Some chemicals can remain in treated waste in undesirable concentrations.

Disposal of the treated waste can also be problematic. Transporting sludge from wastewater treatment plants to landfills, and burying the sludge, are expensive, time-consuming processes that often have negative environment impact. Sludge buried in landfills can release methane gas into the atmosphere. Effluent released into rivers and oceans often contains high levels of ammonia and other deleterious substances which can be harmful to the environment.

Various wastewater treatment methods and methods for dealing with sludges are described the following United States patents:
  U.S. Pat. No. 3,342,731 (Gotthold)
  U.S. Pat. No. 3,428,554 (Dye)
  U.S. Pat. No. 3,440,165 (Davis et al.)
  U.S. Pat. No. 3,549,529 (Wiseman)
  U.S. Pat. No. 3,728,254 (Carothers)
  U.S. Pat. No. 3,803,806 (Komline Sr.)
  U.S. Pat. No. 4,028,130 (Webster et al.)
  U.S. Pat. No. 4,297,122 (Wallace)
  U.S. Pat. No. 4,554,002 (Nicholson)
  U.S. Pat. No. 4,778,598 (Hoffman et al.)
  U.S. Pat. No. 4,541,933 (Armold et al.)
  U.S. Pat. No. 4,917,802 (Fukaya et al.)
  U.S. Pat. No. 5,078,882 (Northrop)
  U.S. Pat. No. 5,336,290 (Jermstad)
  U.S. Pat. No. 5,482,528 (Angell et al.)
  U.S. Pat. No. 5,853,590 (Burnham)
Another water treatment process is described in GB 2216114A.

There is a need for cost-effective, environmentally friendly, wastewater treatment systems that reduce or avoid disadvantages of existing wastewater treatment systems.

BRIEF DESCRIPTION OF DRAWINGS

The accompanying drawings illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The present invention relates to systems for treating waste-activated sludge. In some embodiments, a system according to the invention takes the place of, or augments, a digester in a wastewater treatment plant. Waste-activated sludge is received and mixed with a material that assists in treating the sludge. The material may be or comprise a pozzolanic material. The term "pozzolanic material" as used in this description, includes without limitation:
  sedimented lava ashes;
  fly ashes;
  aluminosilicates;
  diatomaceous earth;
  natural pozzolans;
  mixtures thereof; and,
  mixtures of one or more of the above materials with other materials.
In some embodiments the material comprises lime and a pozzolanic material.
Some specific examples of materials that may be mixed with the waste-activated sludge include:
  mixtures of sedimented lava ash and lime;
  mixtures of lime and natural aluminosilicates having a lime content exceeding 16% (in some embodiments at least 18%) by weight and an alumino-oxide content less than the lime content;
  fly ash with a calcium content of greater than 12% by weight (in some embodiments at least 18% by weight), and an aluminum content less than the calcium content.
  mixtures of pozzolanic materials such as diatomaceous earth comprising an alumino-oxide content of up to 15% by weight and a calcium oxide content of at least 18% by weight.
The material is finely divided. Preferably the material is micronized so that particles of the materials are 200 mesh or finer (i.e. 75 microns or smaller).

The mixture is homogenized and aerated. Solids are allowed to settle and removed. The solid products resulting from the process may be used as soil enhancers, fertilizer, animal litter, concrete additives (e.g. for the production of bricks, building blocks, lightweight cast concrete and diverse other lightweight building materials), road bases or the like. Effluent is returned to the process for further treatment or returned to the wastewater treatment plant.

Figure 1:
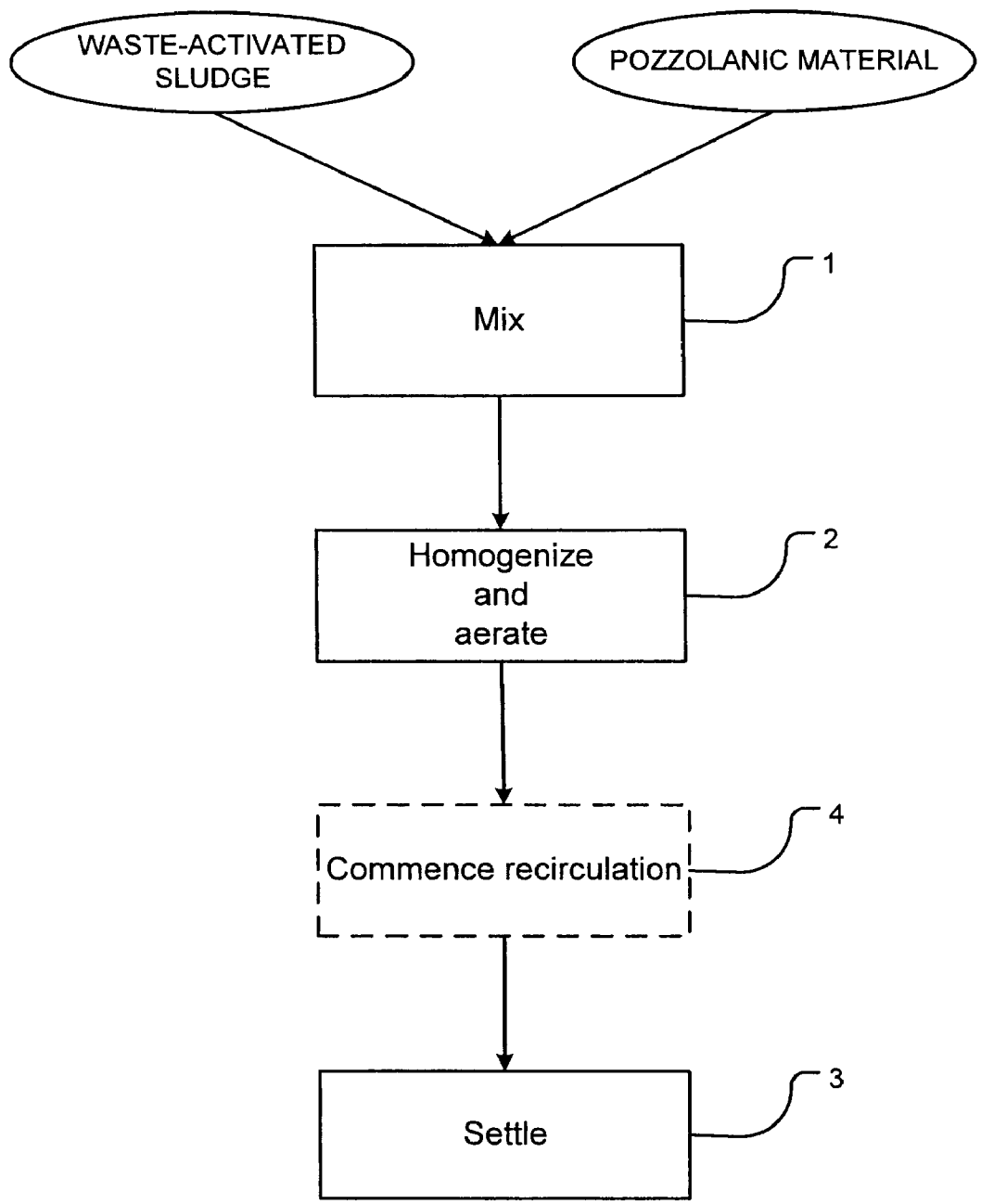
FIG. 1 is a flowchart of a method according to one embodiment of the invention.

FIG. 1 shows major steps in a waste-activated sludge treatment method according to one embodiment of the invention. At step 1, waste-activated sludge is mixed with a pozzolanic material. The waste-activated sludge may be received from a conventional wastewater treatment plant, such as a plant treating municipal wastewater, for example.

At step 2, the mixture of waste-activated sludge and pozzolanic material is homogenized and aerated. Homogenization and aeration bring the waste-activated sludge into intimate contact with the pozzolanic material. As a result, the alkalinity of the mixture is increased, resulting in a high pH level in the mixture.

Maintaining an elevated pH can kill or prevent from growing undesirable microorganisms such as pathogens and methanogenic bacteria in the mixture. Reducing or eliminating methanogenic bacteria can reduce the release of methane gas from the process especially as compared to some prior processes where methanogenic bacteria can thrive.

Homogenization and/or aeration may be carried out at a predetermined temperature or temperature range. For example, in some embodiments homogenization and/or aeration are carried out at temperatures below 50° C. Although higher temperatures may be used, typically the process is carried out at lower temperatures. In typical applications no heating of incoming waste actuated sludge is required. The process may be carried out at ambient temperatures, for example, temperatures in the range of just above freezing to 20° C. or 30° C.

It is desirable that the pH of the mixture be greater than about 10. In some embodiments the pH of the mixture of waste-activated sludge and pozzolanic material during aeration is in the range of 11 to 12.5.

At step 3, solids are settled out of the mixture. Pozzolanic material has been found to dewater and thicken waste-activated sludge. In some embodiments, the settled solids may have a solids content in excess of 15%. For example, in a prototype system, the solids recovered after step 3 have been found to have a solids content in the range of 12.5% or 15% to 20% without forced dewatering, which is significantly higher than the average solids content of products of some conventional wastewater treatment methods that include a forced dewatering step. As a further example, in a prototype system incorporating a simple screw press system for forced dewatering, recovered solids have been found to have a solids content in the range of 35 to 60%, or more, depending upon the amount of added pozzolanic material.

At step 4, recirculation is initiated. Recirculation involves taking a portion of the mixture that includes pozzolanic material from a downstream location and introducing the portion of the mixture back into the process at an upstream location. In some embodiments, the pozzolanic material may be recirculated up to three times. In other embodiments, the pozzolanic material may be recirculated more than three times. The amount of recirculation may be chosen in part based upon the desired end use for the settled solids material. In some embodiments recirculation is not performed. In such alternative embodiments a suitable amount of pozzolanic material is added and allowed to run through the process.

In some embodiments the upstream location is near or at a location where the pozzolanic material is added to the waste-activated sludge. For example, the upstream location may comprise a mixing chamber at which the pozzolanic material is mixed with incoming waste-activated sludge. The downstream location may comprise, for example: an aeration chamber, a settling chamber, a point downstream from an aeration chamber, or the like. In some embodiments the downstream location is a settling chamber. In such embodiments, at least some pozzolanic material is recycled before it is discharged with settled solids.

In some alternative embodiments of the invention recirculation is not performed. In such embodiments, a sufficient amount of fresh pozzolanic material is added to treat the incoming waste-activated sludge.

Figure 2:
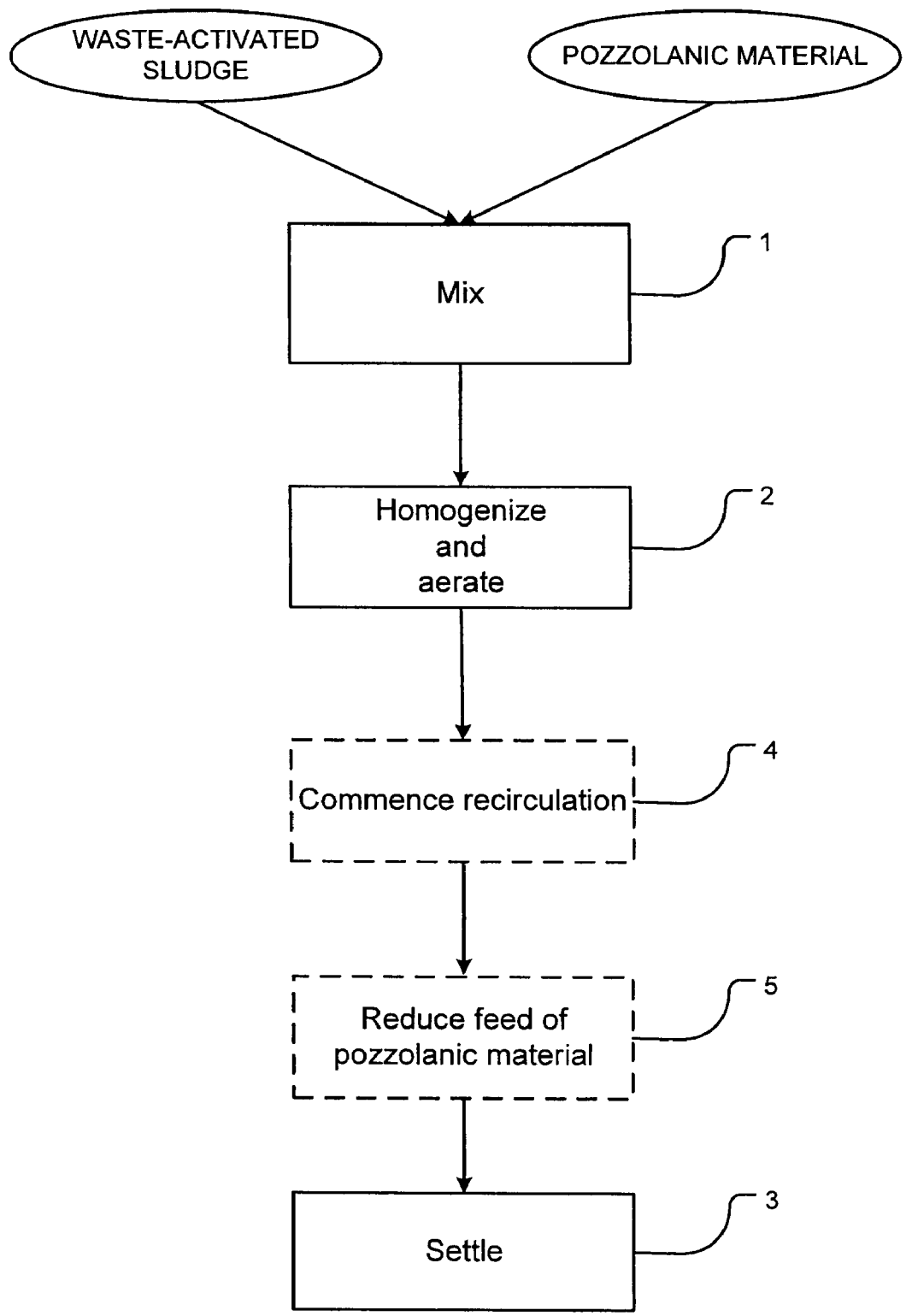
FIG. 2 is a flowchart of a method according to another embodiment of the invention.

FIG. 2 illustrates a method according to an alternative embodiment of the invention similar to the method shown in FIG. 1 but additionally including a step 5 wherein the addition of pozzolanic material at step 1 is reduced or shut down in conjunction with initiating recirculation to utilize recirculating pozzolanic material. Cost savings can be achieved by reducing or shutting off the addition of fresh pozzolanic material.

Figure 3:
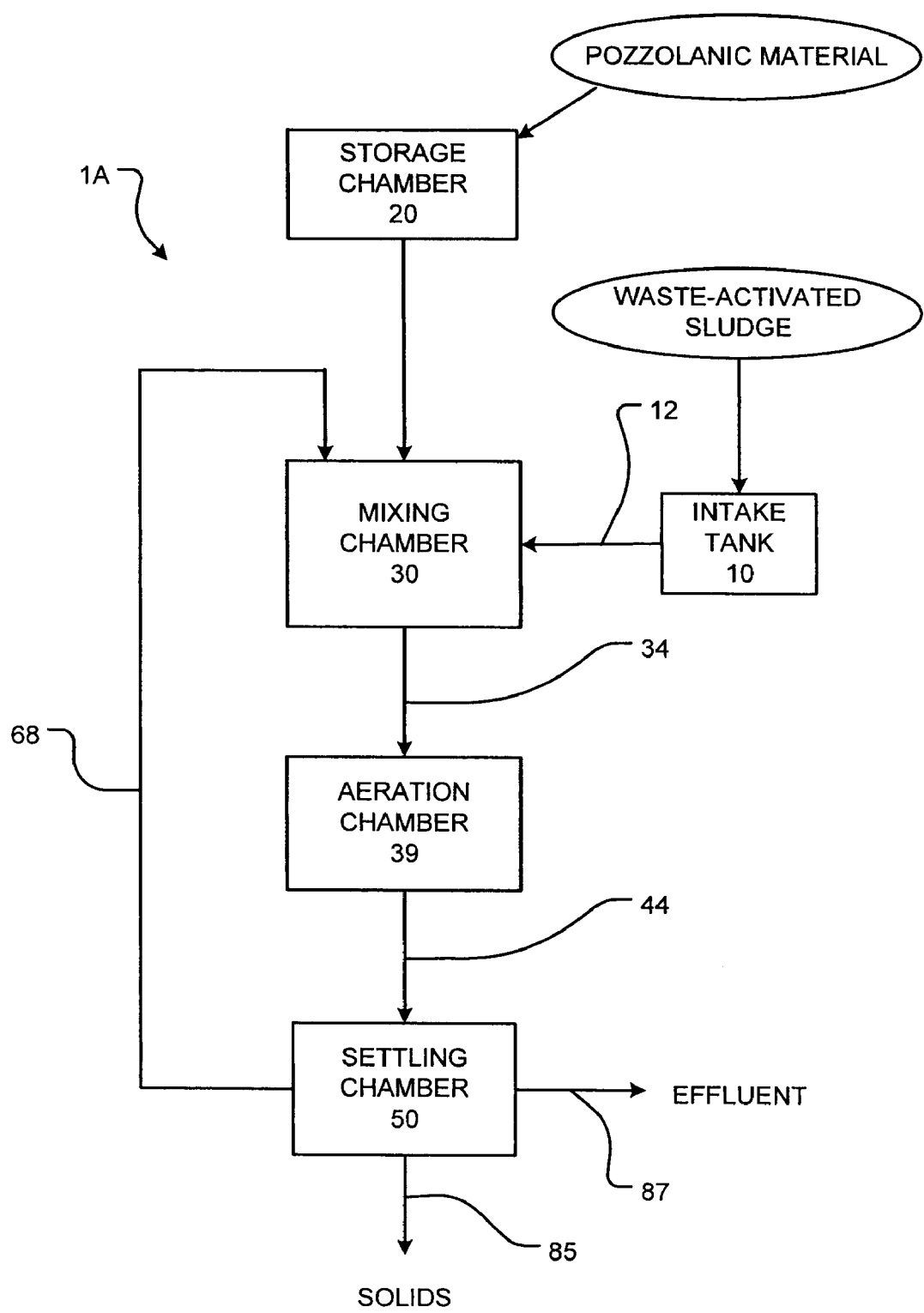
FIG. 3 is a diagram of sludge treatment apparatus according to one embodiment of the invention.

FIG. 3 illustrates an apparatus 1A according to one embodiment of the invention. Waste-activated sludge is continuously delivered from an intake tank 10 through a line 12 to mixing chamber 30. Pozzolanic material is delivered from storage chamber 20 to mixing chamber 30 by a metering mechanism (not shown). The pozzolanic material may be provided as a powder. In some embodiments, the size of particles in the powder is finer than 0.08 mm preferably finer than 0.01 mm. The pozzolanic material may be added at a suitable rate. The best rate to add pozzolanic material will depend on the constitution of the waste-activated sludge being treated and on the composition of the pozzolanic material. In some embodiments, pozzolanic material is added at a rate such that there is a ratio of about 1:5 to about 1:14 of the pozzolanic material to incoming waste-activated sludge. Mixing means within mixing chamber 30 mixes the pozzolanic material and waste-activated sludge. The mixing means may comprise a moveable paddle or other agitator, for example.

The mixture is fed through line 34 to aeration chamber 39, where the mixture is aerated by aerating means. The aerating means may comprise a source of compressed air connected to a diffuser from which air is diffused into the mixture.

The volume of aeration chamber 39 may be such that the mixture has an average residence time in aeration chamber 39 of about 48 hours, for example. Aeration chamber 39 may have a capacity of at least 150 times the flow rate, for example 200 times or about 300 times (in liters) the rate of flow of incoming waste-activated sludge, (in liters/min) for example. The aerated mixture is delivered through line 44 to settling chamber 50 and allowed to settle. Some of the settled mixture may be recirculated through line 68 back to mixing chamber 30. Pozzolanic material in the recirculated settled mixture is thereby made available to react with fresh waste-activated sludge from intake tank 10.

Settled solids may be removed periodically or continuously from settling chamber 50 at solids outlet line 85 (see FIG. 3). Effluent may be removed from apparatus 1A at effluent outlet line 87.

Figure 4A:
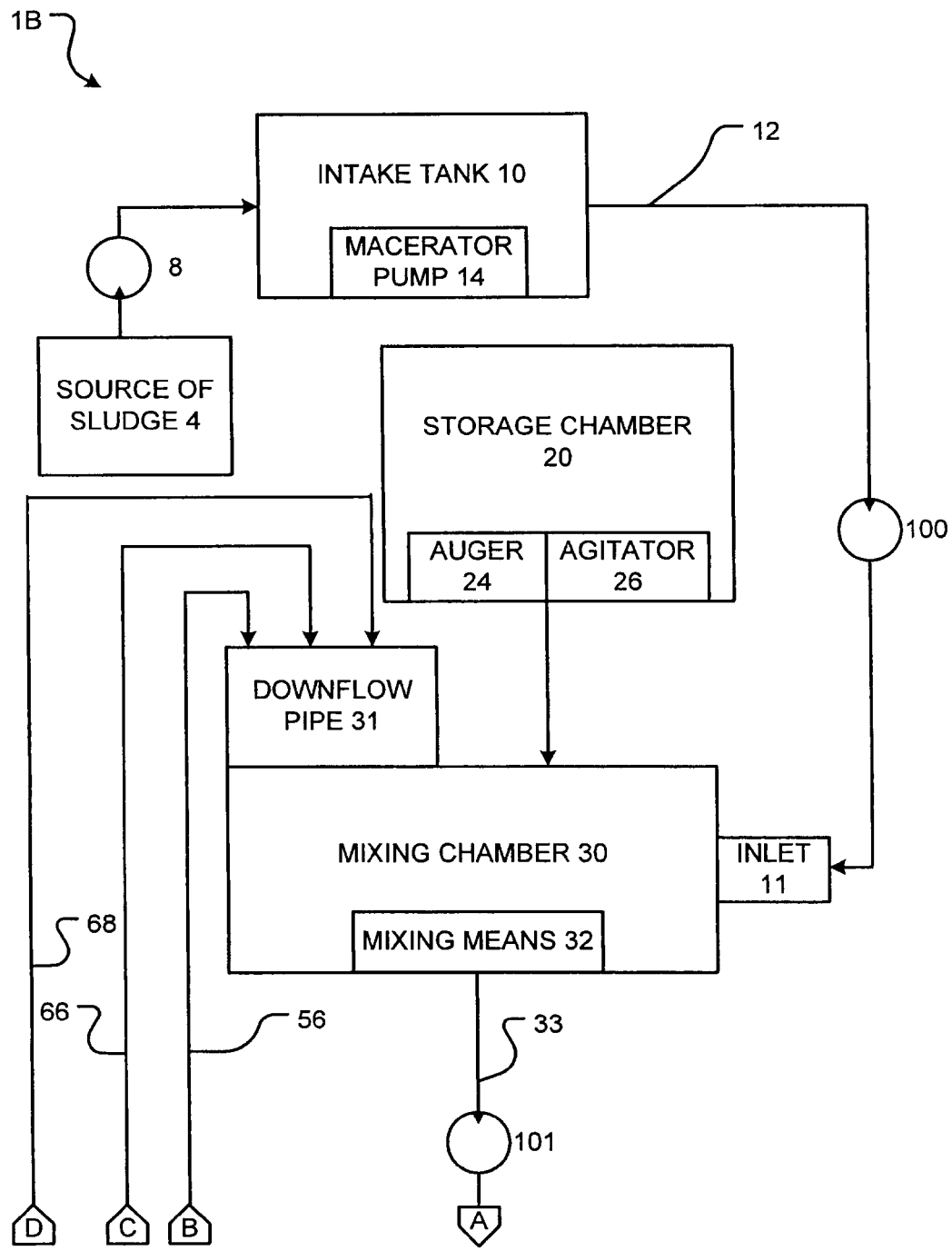
FIGS. 4A to 4C are schematic diagrams of sludge treatment apparatus according to a more detailed embodiment of the invention.
Figure 4B:
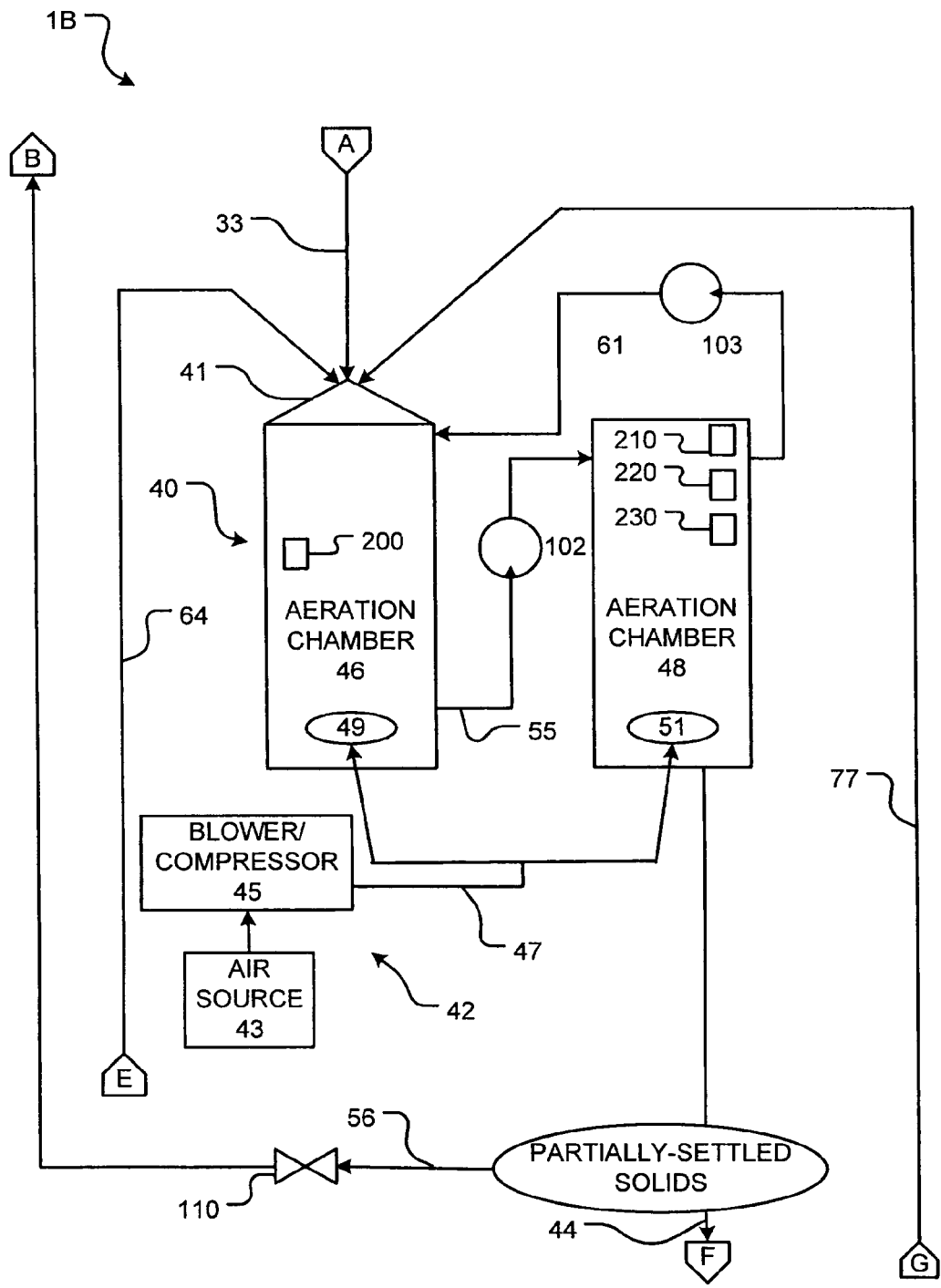
Figure 4C:
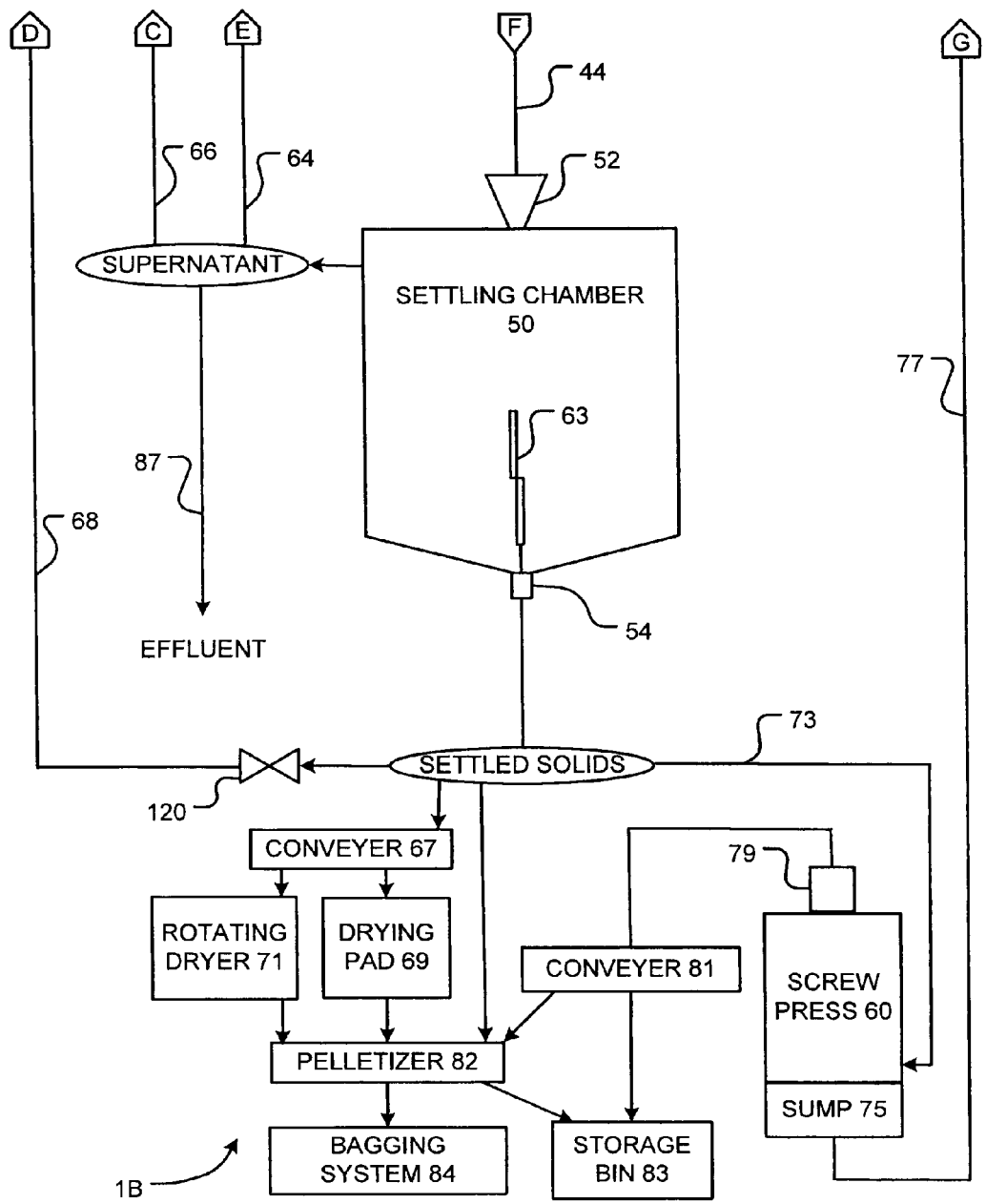

FIGS. 4A to 4C illustrate in more detail an apparatus 1B similar to apparatus 1A of FIG. 3. Waste-activated sludge is pumped from a source of waste-activated sludge such as a conventional wastewater treatment plant 4 by transfer pump 8 to intake tank 10. Intake tank 10 includes macerator pump 14 for homogenizing the waste-activated sludge before it is delivered to mixing chamber 30. In other embodiments, intake tank 10 does not include a macerator pump 14.

In other embodiments, the waste-activated sludge is homogenized by other suitable means, such as an agitator, blender, shaker, vibrator, ultrasonic device or the like. The waste-activated sludge is delivered by pump 100 through line 12 to inlet 11 of mixing chamber 30. In some embodiments, inlet 11 is disposed in a side of mixing chamber 30 at a point approximately at halfway between the top and bottom of mixing chamber 30.

Pozzolanic material is stored in storage chamber 20. In a typical larger-scale embodiment, one or more storage tanks may be provided to maintain a supply of pozzolanic material sufficient to cover the expected consumption of pozzolanic material for a reasonable period. The storage tanks may be equipped with suitable conveyor systems, such as screw augers, to carry pozzolanic material from the storage tank(s) to storage chamber 20 (or directly to mixing chamber 30 in some embodiments) as needed.

Figure 5:
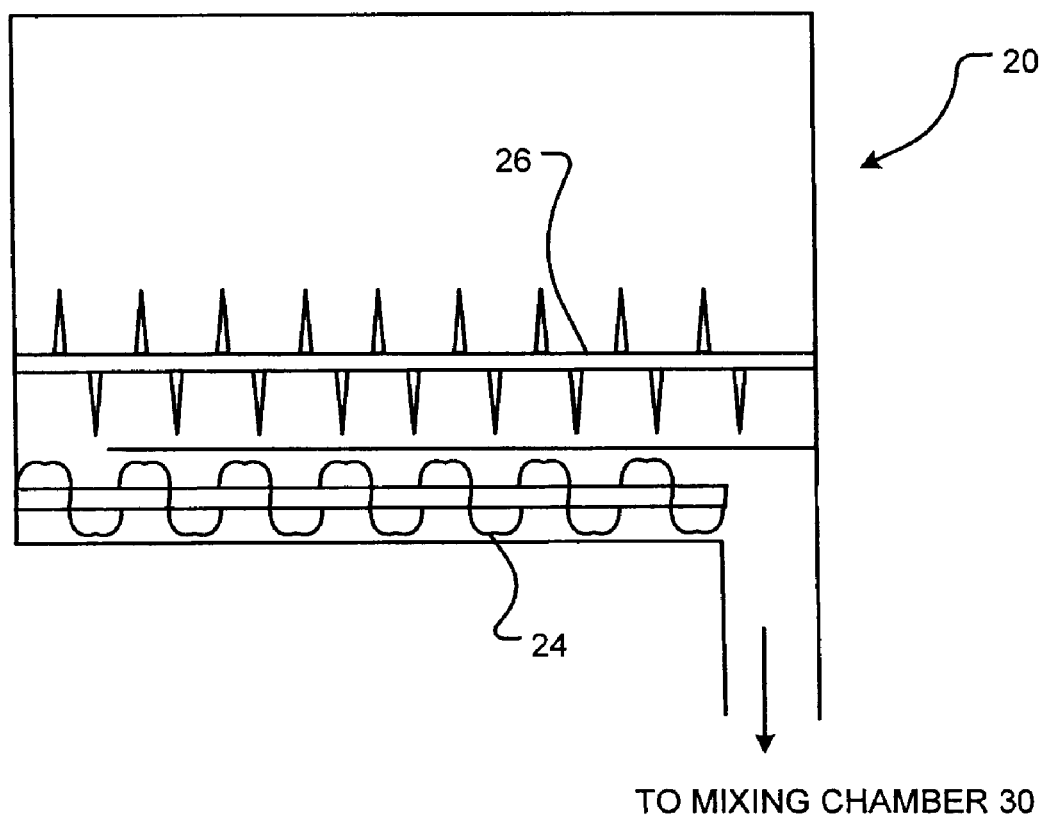
FIG. 5 is a schematic diagram of a storage chamber according to one embodiment of the invention.

Storage chamber 20 comprises auger 24 and agitator 26. Auger 24 and agitator 26 cooperate to deliver pozzolanic material to mixing chamber 30. Auger 24 advances a controlled volume of pozzolanic material from the interior of storage 20 to line 22. As shown in FIG. 5, auger 24 may comprise a screw knife auger, for example. The volume of pozzolanic material delivered to mixing chamber 30 may be controlled such that a delivered volume is dependent on the volume of activated waste being added to mixing chamber 30.

Agitator 26 maintains the pozzolanic material in the interior of storage chamber 20 in a consistent uniform state. In particular, agitator 26 prevents "funneling" of the pozzolanic material as auger 24 withdraws pozzolanic material from storage chamber 20. As shown in FIG. 5, agitator 26 is positioned above auger 24 and may comprise a shaft having multiple knife arms protruding from it. Agitator 26 may extend parallel to auger 24 and may rotate in a direction opposite to a direction of rotation of auger 24. Agitator 26 causes pozzolanic material within storage chamber 20 to fall down onto auger 24 from where it can be delivered to mixing chamber 30 by operating auger 24.

Storage chamber 20 may be positioned above mixing chamber 30 so as to allow pozzolanic material withdrawn from storage chamber 20 by auger 24 to free-fall by gravity into mixing chamber 30.

Pozzolanic material and waste-activated sludge are mixed in mixing chamber 30. Mixing means 32 of mixing chamber 30 may comprise an agitator. Agitator 32 may, for example, comprise a vertical shaft with multiple propellers fixed at different heights along the shaft (not shown). The speed of agitator 32 may be controlled such that the agitation speed is dependent on the volume of activated waste being added to mixing chamber 30, for example. Mixing means 32 may comprise any suitable mechanism for homogenizing the pozzolanic material and waste-activated sludge. In other embodiments, for example, mixing means 32 may comprise a blender, macerator, shaker, vibrator, ultrasonic device, or the like.

A downflow pipe 31 disposed on top of mixing chamber 30 receives recirculating material, as discussed below. The mixture formed in mixing chamber 30 is pumped by pump 101 through line 33 to aeration system 40.

Aeration system 40 comprises a first aeration chamber 46 and a second aeration chamber 48 in this embodiment. Aeration chambers 46, 48 may be cylindrical. In other embodiments, the aeration chambers 46, 48 may be cuboidal or other shape. An upper end of aeration chamber 46 may comprise a conical distributor 41 through which the mixture is evenly distributed as it enters first aeration chamber 46 from line 33. Aeration chamber 46 and/or 48 may have a lower section in the form of a hopper to facilitate collection and discharge of settling solids.

Air is supplied by air source 43 delivered by blower/compressor 45 through line 47 to aeration grids 49, 51. The volume of air delivered by blower/compressor 45 may be controlled to be dependent on the volume of activated waste being added to mixing chamber 30. Aeration grids 49, 51 are disposed at the bottom of aeration chambers 46, 48 and continuously diffuse air through aeration chambers 46, 48. Aeration grids 49, 51 may be shaped to correspond to the cross-sectional shape of aeration chambers 46, 48.

In one embodiment, aeration grids 49, 51 comprise numerous small one-way valves having openings with a diameter of 3 mm to 6 mm. The valves permit air to flow into aeration chambers 46, 48 but prevent fluid from aeration chambers 46, 48 from flowing into aeration grids 49, 51 when compressor 45 is not operating. Aeration grids 49, 51 may be one-stage or two-stage grids. In other embodiments, aeration may be provided by other suitable means such as an agitator, venturi or the like.

When starting up apparatus 1B, air is preferably provided to aeration chambers 46, 48 only after aeration chamber 46 is at least 20% filled with the mixture. In other embodiments air may be provided at an earlier or later point.

Once the mixture level in first aeration chamber 46 reaches a predetermined level, level sensor 200 is activated. Level sensor 200 controls the operation of pump 102 to pump the mixture from a bottom region of aeration chamber 46 through line 55 to a top region of aeration chamber 48 while maintaining first aeration chamber 46 at a state that is neither over full nor too low.

Level sensors in each aeration chamber may be connected to a control system (not shown). The control system may operate valves and/or pumps to establish desired operating fluid levels in each of aeration chambers 46 and 48.

Eventually the mixture partially settles in aeration chambers 46, 48. Conductivity sensor 210 and turbidity sensor 220 monitor conductivity and clarity of the mixture in an upper portion of aeration chamber 48. When sensors 210, 220 sense conductivity or clarity or both are at predetermined levels, pump 103 is caused to activate and recirculate supernatant from the upper region of aeration chamber 48 through line 61 to aeration chamber 46.

In some embodiments, pump 103 recirculates the supernatant to a point upstream of pump 101. In such embodiments, activation of pump 103 causes pump 101 to pump faster, to pump into aeration chamber 46 the recirculating supernatant from aeration chamber 48 in addition to inflowing mixture from mixing chamber 30.

After initial start up, apparatus 1B in some embodiments may operate at a steady state wherein the fluid level of aeration chambers 46, 48 is relatively constant. In this steady state, pump 101 pumps incoming mixture from mixing chamber 30 into aeration chamber 46, aeration system 40 continuously diffuses air through aeration chambers 46, 48, and pumps 102 and 103 continuously pump the mixture between aeration chambers 46, 48. Partially-settled solids are discharged from aeration chamber 48 at a rate substantially equivalent to the rate of incoming mixture from mixing chamber 30. Aeration grid 51 may be deactivated periodically to permit solids to at least partially settle in aeration chamber 48.

Partially-settled solids discharged from aeration chamber 48 are delivered through line 44 to settling chamber 50. Partially-settled solids from aeration chamber 48 may also be recirculated through line 56 and downflow pipe 31 to mixing chamber 30. Recirculation through line 56 may be regulated by return valve 110. Return valve 110 may be opened, for example, in response to level sensor 230 detecting that second aeration chamber 48 is nearly full.

Partially-settled solids from aeration chamber 48 settle further in settling chamber 50. Settling chamber 50 may be at least twice as large as aeration chambers 46 and 48 for more effective settling. Settling chamber 50 may have a slightly depressed bottom end. The mixture from aeration chamber 48 is introduced to settling chamber 50 through inlet 52 on the top of settling chamber 50. Inlet 52 may comprise a low-turbulence funnel. Settling chamber 50 may also include a split vibration plate 63 to prevent "funneling" as the settled solids are discharged through outlet 54. Split vibration plate 63 may include one or more vibrators (not shown).

Supernatant from settling chamber 50 has a low Chemical Oxygen Demand (COD), low Biological Oxygen Demand (BOD) and low ammonia concentration (may be less than 3.0 mg/L). The supernatant may be delivered through line 87 back into the wastewater treatment plant 4. Supernatant may also, or in the alternative, be recirculated through line 64 to aeration chamber 46, or through line 66 and downflow pipe 31 to mixing chamber 30.

Settled solids from settling chamber 50 may have solids content of 10% or 15% to 20%, which is higher than typical solids contents achieved with conventional wastewater treatment systems. The settled solids may be recirculated through line 68 and downflow pipe 31 to mixing chamber 30. Return valve 120 regulates the recirculation of the settled solids through line 68.

The settled solids from settling chamber 50 may also be delivered via conveyor 67 to either a drying pad 69 for natural drying or rotating dryer 71 for quick drying. Optionally the settled solids may be delivered through line 73 to a press, such as a screw press 60 extract liquids from the settled solids. The solids content of the solids may be increased by pressing out liquids in screw press 60. In some embodiments the solids are delivered to a pelletizer 82. Pellets made by pelletizer 82 may be bagged by a bagging system 84 for convenient handling or stored and transported in bulk.

Screw press 60 may comprise a low volume vertical screw press. This type of screw press has low energy consumption. Suitable screw presses are commercially available and are marketed for use in conventional small and medium waste-activated sludge treatment plants. Screw press 60 receives incoming settled solids from settling chamber 50 and conveys them upwards through a double-walled column. As the material advances upward, the material is also forced laterally through a first wall with small perforations and a second wall with larger perforations. Water is thereby pressed out from the material and collected in sump 75 to be recirculated through line 77 to aeration chamber 46. Material that advances up through the screw press 60 is ejected through spout 79 at the top of screw press 60 onto a conveyor 81 and delivered to storage bins 83 for storage. The feed pressure of screw press 60 may be adjusted to achieve a desired solids content. The final material may have a solids content of 60% or more, for example. In the alternative, solids from conveyor 81, rotating dryer 71 or drying pad 69 may be delivered to pelletizer 82 that forms the solids into pellets. The pellets may be stored in a storage bin 83 or bagged by bagging system 84.

The addition of fresh pozzolanic material from storage chamber 20 may be reduced or stopped as pozzolanic material is recirculated to mixing chamber 30.

In some embodiments, a flow valve or other suitable flow sensor (not shown) disposed in downflow pipe 31, or return valves 110 and 120, for example, monitors the flow rate and/or volume of recirculated material. A control system monitoring signals from the sensor may detect when the flow of recirculated material reaches a predetermined threshold rate, or the volume of recirculated material reaches a predetermined threshold volume. The controller may control auger 24. The controller may slow or stop auger 24 in response to a magnitude of the signal from the sensor or in response to the signal indicating that the threshold rate or volume has been reached.

For example, the addition of fresh pozzolanic material may be shut off for a certain number of "cycles" of recirculating mixture. One cycle may comprise the recirculation of the mixture from aeration chamber 48 back to aeration chamber 46 as fresh waste-activated sludge is delivered to aeration chamber 46. For example, in a prototype system, waste-activated sludge was sufficiently treated through up to at least three cycles of the recirculated mixture without further addition of fresh pozzolanic material.

Many of the components of the apparatus may be driven by motors. It is convenient, but not mandatory, to permit the speed of operation of at least auger 24, agitator 32 and screw press 60 to be varied. These components may be driven by variable-speed motors (such as, for example, three phase AC motors driven by variable frequency drives). Other motors may be single-speed motors, although this is not mandatory. For example, agitator 26, blower/compressor 45, and pumps 100, 101, 102 and 103, may be driven by fixed-speed three phase AC motors or other suitable electric motors.

Some embodiments of the invention may have one or more advantages over existing waste-activated sludge treatment methods. Such advantages may include one or more of the following:

- converting waste-activated sludge into environmentally-friendly products such as soil enhancers, lightweight building aggregates, and the like;
- reducing or eliminating the need to transport treated sludge to landfills;
- encapsulating water-soluble heavy metals in waste-activated sludge;
- reducing or eliminating pathogenic bacteria and other organisms in waste-activated sludge;
- reducing the output of methane gas as compared to other wastewater treatment processes;
- reducing or eliminating unpleasant odours as compared to other wastewater treatment processes;
- reducing ammonia concentrations in effluent discharged into the environment;
- reducing Chemical Oxygen Demand (COD) and Biological Oxygen Demand (BOD) in effluent discharged into the environment;
- saving costs and time by reducing waste-activated sludge treatment times;
- eliminating or reducing the use of chemical dewatering, thickening and/or flocculating agents—preferred embodiments eliminate the need for such agents—in many embodiments, the addition of conventional dewatering, thickening and/or flocculating agents is undesirable; and
- enhancing the separation of solids and fluids in waste-activated sludge.

While methods described herein illustrate potential advantages of some embodiments of the invention, it will be appreciated that some embodiments of the invention do not require that all of the above advantages be achieved, or completely achieved.

Figure 6:
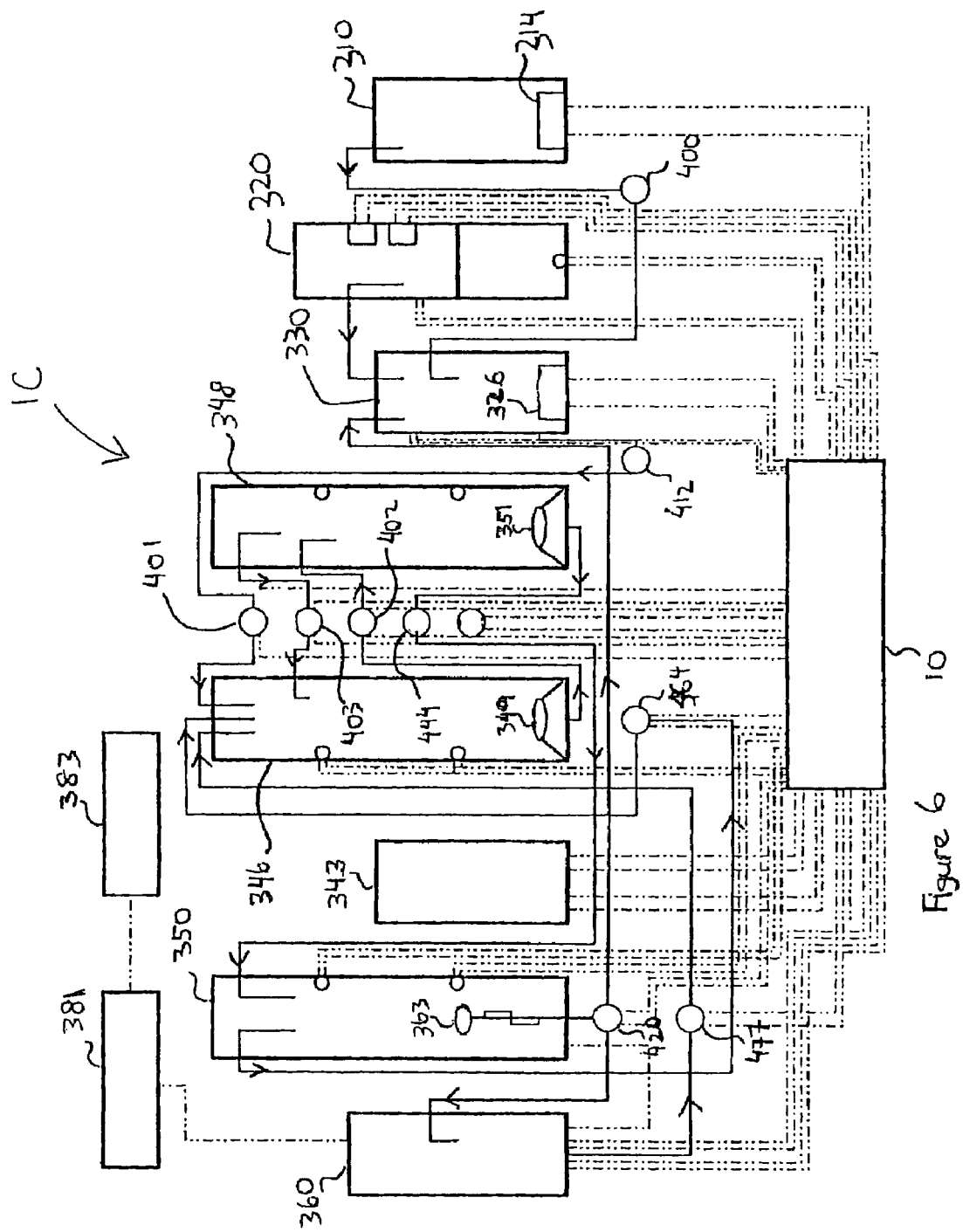
FIG. 6 is a schematic diagram of sludge treatment apparatus according to another embodiment of the invention.

As will be apparent to those skilled in the art in the light of the foregoing disclosure, many alterations and modifications are possible in the practice of this invention without departing from the spirit or scope thereof. For example:

- a control station (not shown) may be provided to electronically and/or mechanically control many of the components of the present invention including, but not limited to macerator pump 14, auger 24, agitator 32, blower 45, screw press 60, return vales 66 and 68, pumps 100, 101, 102 and 103, and sensors 200, 210, 220, and 230. The control station may include a user interface displaying a graphical representation of these components and their status (e.g. "on" or "off", motor speed, temperature, etc.). FIG. 6 illustrates apparatus 1C, an alternative embodiment of the invention wherein a control station 10 controls many components of the apparatus (as shown by the dotted lines). Apparatus 1C is substantially similar to apparatus 1B, and the components of apparatus 1C function in a substantially similar manner to the corresponding components of apparatus 1B. The components of apparatus 1C corresponding to the components of apparatus 1B include intake tank 310, macerating pump 314, pump 400, storage chamber 320, mixing chamber 330, agitator 326, first aeration chamber 346, second aeration chamber 348, air source 343, aeration grids 349, 351, settling chamber 360, vibration split plate 363, screw press 360, conveyor 381 and storage bin 381. Also corresponding to components of apparatus 1B are pumps 400, 401, 402 and 403. Pump 412 pumps the mixture from mixing chamber 330 to pump 401. Pump 444 pumps partially-settled solids from aeration chamber 348 to settling chamber 350. Return valve 420 corresponds to valve 120 of apparatus 1B. Pump 464 pumps supernatant from settling chamber 350 to an upper portion of first aeration chamber 346. Pump 477 pumps pressate from screw press 360 to the upper portion of first aeration chamber 346.
- pozzolanic material may be withdrawn from storage chamber 20, 320 by means other than an auger/agitator.
- Aeration system 40 may comprise a single chamber in other embodiments. In yet other embodiments, aeration system 40 may comprise three or more aeration chambers.
- Methods and apparatus as described herein may be applied to treating harbor sludge or mine sludge.
- Alternative methods according to some embodiments of the invention operate as batch processes in which the introduction of waste-activated sludge is stopped or reduced during treatment.

This invention has a wide range of aspects. While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations.

What is claimed is:

1. A method for treating waste-activated sludge, the method comprising:
   (a) adding pozzolanic material to waste-activated sludge to form a mixture;
   (b) homogenizing and aerating the mixture to react the pozzolanic material with the waste-activated sludge;
   (c) settling the mixture;
   (d) recirculating a portion of the mixture from a downstream location to an upstream location wherein the portion of the mixture being recirculated includes pozzolanic material.

2. A method according to claim 1 wherein adding the pozzolanic material comprises adding a powder comprising particles of 200 mesh or finer.

3. A method according to claim 2 comprising:
   (e) decreasing the rate of adding fresh pozzolanic material at step (a) as pozzolanic material is recirculated at step (d).

4. A method according to claim 2 wherein settling step (c) comprises:
   (i) allowing the mixture to partially settle in an aeration chamber; and
   (ii) allowing the mixture to settle further in a settling chamber.

5. A method according to claim 4 wherein recirculating step (d) comprises recirculating the partially-settled mixture in the aeration chamber to a location at which step (a) is performed.

6. A method according claim 4 wherein recirculating step (d) comprises recirculating the further-settled mixture in the settling chamber to a location at which step (a) is performed.

7. A method according to claim 4 comprising recirculating a clarified portion of the settled mixture to the aeration chamber after step (c).

8. A method according to claim 1 comprising delivering a clarified portion of the settled mixture to an effluent discharge after step (c).

9. A method according to claim 2 wherein aerating at step (b) comprises circulating the mixture through a plurality of aeration chambers while allowing air bubbles to percolate through the aeration chambers.

10. A method according to claim 9 wherein aerating at step (b) comprises:
    (i) providing a first aeration chamber and a second aeration chamber;
    (ii) pumping the mixture to a top portion of the first aeration chamber;
    (iii) pumping the mixture from a bottom portion of the first aeration chamber to a top portion of the second aeration chamber; and
    (iv) recirculating the mixture from a top portion of the second aeration chamber to the top portion of the first aeration chamber.

11. A method according to claim 10, comprising commencing step (iii) after a top surface of the mixture in the first aeration chamber has risen to a predetermined level.

12. A method according to claim 11, comprising commencing step (iv) after one or more of a conductivity and a turbidity of the mixture in the top portion of the second aeration chamber reaches a predetermined level.

13. A method according to claim 10 comprising increasing the rate of the pumping in step (ii) upon commencing step (iv).

14. A method according to claim 2 comprising homogenizing the waste-activated sludge before step (a).

15. A method according to claim 2 wherein the mixture is homogenized at step (b) at a rate corresponding to the rate at which waste-activated sludge is provided at step (a).

16. A method according to claim 15 wherein homogenizing at step (b) comprises agitating the mixture.

17. A method according to claim 2 wherein the pozzolanic material comprises a material selected from the group consisting of: sedimented lava ashes; fly ashes; aluminosilicates; diatomaceous earths; natural pozzolans; and mixtures thereof.

18. A method according to claim 17 wherein the pozzolanic material comprises lime.

19. A method according to claim 17 wherein the pozzolanic material comprises lava ash.

20. A method according to claim 2 wherein the pozzolanic material has a calcium content greater than 12% by weight.

21. A method according to claim 20 wherein the calcium content is at least 18% by weight.

22. A method according to claim 20 wherein the pozzolanic material has an aluminum content that is less than the calcium content of the pozzolanic material.

23. A method according to claim 18 wherein the mixture has a lime content of at least 18% by weight and an aluminum content less than the lime content.

24. A method according to claim 17 wherein the pozzolanic material comprises fly ash and has a calcium content of at least 18% by weight and an aluminum content less than the calcium content.

25. A method according to claim 17 wherein the mixture has a pH in excess of about 10 after adding the pozzolanic material at step (a).

26. A method according to claim 2 comprising drying at least a portion of the settled mixture.

27. A method according to claim 26 comprising pressing at least a portion of the settled mixture.

28. A method according to claim 27, wherein pressing comprises conveying the portion of the settled mixture through a screw press.

29. A method according to claim 27 comprising pelletizing at least a portion of the settled mixture.

30. An apparatus for treating waste-activated sludge from a source, the apparatus comprising:
   a storage chamber for storing a pozzolanic material;
   a mixing chamber downstream of the storage chamber for receiving the waste-activated sludge and the pozzolanic material, the mixing chamber comprising means for homogenizing the pozzolanic material and the waste-activated sludge to form a mixture;
   an aeration chamber downstream of the mixing chamber for aerating the mixture;
   a settling chamber downstream of the aeration chamber for settling the aerated mixture, the settling chamber comprising:
      an inlet; and
      an outlet for discharging the settled mixture wherein at least a portion of the settled mixture is recirculated to an upstream location; and
   a means for regulating flow of the pozzolanic material from the storage chamber to the mixing chamber;
wherein the means for regulating the flow of pozzolanic material regulates the flow based at least in part upon a flow rate of the portion of the settled mixture recirculating from the outlet of the settling chamber to the upstream location.

31. An apparatus according to claim 30 wherein the upstream location is the mixing chamber.

32. An apparatus according to claim 30 wherein the aeration chamber comprises:
   a first aeration chamber comprising:
      a first inlet in flow communication with the mixing chamber to receive the mixture from the mixing chamber;
      a second inlet;
      an outlet;
   a second aeration chamber comprising:
      an inlet in flow communication with the outlet of the first aeration chamber to receive the mixture from the first aeration chamber;
      a first outlet in flow communication with the second inlet of the first aeration chamber to recirculate a portion of the mixture to the first aeration chamber;
      a second outlet in flow communication with the settling chamber to discharge a portion of the mixture to the settling chamber;
      an aeration system in flow communication with the first aeration chamber and the second aeration chamber.

33. An apparatus according to claim 32, wherein the aeration system comprises:
   at least one aeration grid disposed within each of the first aeration chamber and the second aeration chamber;
   an air source; and
   a blower forcing air from the air source to the aeration grids.

34. An apparatus according to claim 30 wherein the storage chamber is positioned above the mixing chamber, whereby the storage chamber is in gravity-flow communication with the mixing chamber.

35. An apparatus according to claim 30 wherein the storage chamber comprises an agitator for maintaining a uniform consistency of the pozzolanic material stored in the storage chamber.

36. An apparatus according to claim 30 wherein the source of waste-activated sludge comprises an intake tank.

37. An apparatus according to claim 36 wherein the intake tank comprises means for homogenizing the waste-activated sludge.

38. An apparatus according to claim 37 wherein the means for homogenizing the waste-activated sludge comprises a macerator pump.

39. An apparatus according to claim 30 wherein the means for homogenizing the pozzolanic material and the waste-activated sludge comprises an agitator.

40. An apparatus according to claim 30 wherein the inlet of the settling chamber comprises a low turbulence funnel.

41. An apparatus for treating waste-activated sludge from a source, the apparatus comprising:
   a storage chamber for storing a pozzolanic material;
   a mixing chamber downstream of the storage chamber for receiving the waste-activated sludge and the pozzolanic material, the mixing chamber comprising means for homogenizing the pozzolanic material and the waste-activated sludge to form a mixture;
   an aeration chamber downstream of the mixing chamber for aerating the mixture;
   a settling chamber downstream of the aeration chamber for settling the aerated mixture, the settling chamber comprising:
      an inlet; and
      an outlet for discharging the settled mixture wherein at least a portion of the settled mixture is recirculated to an upstream location; and
   a means for regulating flow of the pozzolanic material from the storage chamber to the mixing chamber;
wherein the aeration chamber comprises an outlet for recirculating a partially-settled portion of the mixture to the upstream location.

42. An apparatus for treating waste-activated sludge from a source, the apparatus comprising:
   a storage chamber for storing a pozzolanic material;
   a mixing chamber downstream of the storage chamber for receiving the waste-activated sludge and the pozzolanic material, the mixing chamber comprising means for homogenizing the pozzolanic material and the waste-activated sludge to form a mixture;

an aeration chamber downstream of the mixing chamber for aerating the mixture;

a settling chamber downstream of the aeration chamber for settling the aerated mixture, the settling chamber comprising:

an inlet; and an outlet for discharging the settled mixture wherein at least a portion of the settled mixture is recirculated to an upstream location; and a means for regulating flow of the pozzolanic material from the storage chamber to the mixing chamber;

wherein the settling chamber comprises an outlet for recirculating a clarified portion of the mixture to at least one of the aeration chamber, the mixing chamber and an effluent discharge.

43. An apparatus for treating waste-activated sludge from a source, the apparatus comprising:

a storage chamber for storing a pozzolanic material;

a mixing chamber downstream of the storage chamber for receiving the waste-activated sludge and the pozzolanic material, the mixing chamber comprising means for homogenizing the pozzolanic material and the waste-activated sludge to form a mixture;

an aeration chamber downstream of the mixing chamber for aerating the mixture;

a settling chamber downstream of the aeration chamber for settling the aerated mixture, the settling chamber comprising:

an inlet; and an outlet for discharging the settled mixture wherein at least a portion of the settled mixture is recirculated to an upstream location; and a means for regulating flow of the pozzolanic material from the storage chamber to the mixing chamber;

wherein the settling chamber comprises settling means disposed in the interior of the settling chamber to facilitate settling of the mixture.

44. An apparatus according to claim 43 wherein the settling means comprises a split vibration plate.

45. An apparatus according to claim 43 wherein the outlet discharges the settled mixture to at least one of a press, a pelletizer and a drying means.

46. An apparatus according to claim 43 wherein the outlet discharges the settled mixture to a press and the press comprises a screw press.

47. An apparatus according to claim 43 wherein the outlet discharges the settled mixture to a drying pad.

48. An apparatus according to claim 43 wherein the outlet discharges the settled mixture to a rotating dryer.

49. An apparatus for treating waste-activated sludge from a source, the apparatus comprising:

a storage chamber for storing a pozzolanic material;

a mixing chamber downstream of the storage chamber for receiving the waste-activated sludge and the pozzolanic material, the mixing chamber comprising means for homogenizing the pozzolanic material and the waste-activated sludge to form a mixture;

an aeration chamber downstream of the mixing chamber for aerating the mixture;

a settling chamber downstream of the aeration chamber for settling the aerated mixture, the settling chamber comprising:

an inlet; and an outlet for discharging the settled mixture wherein at least a portion of the settled mixture is recirculated to an upstream location; and a controller connected to control a conveyor system arranged to deliver the pozzolanic material from the storage chamber to the mixing chamber;

wherein the controller is configured to control the conveyor system so as to regulate delivery of the pozzolanic material based at least in part upon a flow rate of the portion of the settled mixture recirculating from the outlet of the settling chamber to the upstream location.

* * * * *